US012177676B2

(12) United States Patent
Chakraborty et al.

(10) Patent No.: US 12,177,676 B2
(45) Date of Patent: Dec. 24, 2024

(54) CHANNEL CONTROL FOR COMMUNICATION USING DYNAMIC SPECTRUM ACCESS

(71) Applicant: Microsoft Technology Licensing, LLC, Redmond, WA (US)

(72) Inventors: Tusher Chakraborty, Bangalore (IN); Deepak Vasisht, Redmond, WA (US); Ranveer Chandra, Kirkland, WA (US); Zerina Kapetanovic, Seattle, WA (US); Heping Shi, Bellevue, WA (US); Nissanka Arachchige Bodhi Priyantha, Redmond, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 18/464,198

(22) Filed: Sep. 8, 2023

(65) Prior Publication Data

US 2023/0422044 A1 Dec. 28, 2023

Related U.S. Application Data

(63) Continuation of application No. 17/820,882, filed on Aug. 18, 2022, now Pat. No. 11,792,653, which is a
(Continued)

(30) Foreign Application Priority Data

May 15, 2020 (IN) .............................. 202041020659

(51) Int. Cl.
*H04W 16/10* (2009.01)
*H04L 5/00* (2006.01)
(Continued)

(52) U.S. Cl.
CPC ............ *H04W 16/10* (2013.01); *H04L 5/0012* (2013.01); *H04L 5/0055* (2013.01); *H04W 72/12* (2013.01); *H04W 72/21* (2023.01); *H04W 72/23* (2023.01)

(58) Field of Classification Search
CPC ............. H04W 16/10; H04W 72/0413; H04W 72/042; H04W 72/1205; H04L 5/0012; H04L 5/0055
See application file for complete search history.

(56) References Cited

U.S. PATENT DOCUMENTS

| 2011/0299481 A1 * | 12/2011 | Kim ...................... H04W 52/30 370/329 |
| 2011/0310866 A1 | 12/2011 | Kennedy et al. |

(Continued)

FOREIGN PATENT DOCUMENTS

WO 2011163055 A1 12/2011

OTHER PUBLICATIONS

Communication pursuant to article 94(3) received for European Application No. 21726250.0, mailed on Jun. 21, 2024, 8 pages.
(Continued)

*Primary Examiner* — Shukri Taha
(74) *Attorney, Agent, or Firm* — Foley IP Law, PLLC

(57) ABSTRACT

The disclosure described herein configures a base station and client devices for communication using dynamic spectrum access within a frequency spectrum that includes selecting, from a list of available channels, a set of channels as active channels. The active channels include uplink channels and downlink channels. An uplink channel and a downlink channel are assigned to a plurality of client devices based on locations the client devices, wherein at least some client devices have active channels in common. Acknowledgements from the subset of client devices having
(Continued)

the common active channel are grouped, the acknowledgements containing medium access control (MAC) commands specific to the subset of client devices, where each message of a plurality of messages on the uplink channels is followed by a downlink acknowledgement.

17 Claims, 11 Drawing Sheets

Related U.S. Application Data continuation of application No. 17/037,533, filed on Sep. 29, 2020, now Pat. No. 11,540,141.

(51) Int. Cl.
*H04W 72/12* (2023.01)
*H04W 72/21* (2023.01)
*H04W 72/23* (2023.01)

(56) References Cited

U.S. PATENT DOCUMENTS

| | | | |
|---|---|---|---|
| 2012/0327894 A1 | 12/2012 | Axmon | |
| 2015/0271771 A1 | 9/2015 | Park | |
| 2019/0238177 A1* | 8/2019 | Liu | H04B 1/713 |

OTHER PUBLICATIONS

Non-Final Office Action mailed on Aug. 15, 2024, in U.S. Appl. No. 18/179,321, 10 pages.

* cited by examiner

CHANNEL CONTROL FOR COMMUNICATION USING DYNAMIC SPECTRUM ACCESS

CROSS-REFERENCE TO RELATED APPLICATION

This nonprovisional application is a continuation of and claims priority to U.S. Non-Provisional application Ser. No. 17/820,882 entitled "Channel Control For Communication Using Dynamic Spectrum Access," filed Aug. 18, 2022, which is a continuation of and claims priority to Ser. No. 17/037,533 (now patent Ser. No. 11/540,141) entitled "Channel Control For Communication Using Dynamic Spectrum Access," filed Sep. 29, 2020, which claims priority to Indian Patent Application No. 202041020659 entitled "Channel Control For Communication Using Dynamic Spectrum Access", filed May 15, 2020, the entire disclosures of which are incorporated by reference herein.

BACKGROUND

Television (TV) white space (TVWS) is the unused or inactive part of the TV spectrum. TVWS covers a wide spectrum of frequencies in the ultra high frequency (UHF) and very high frequency (VHF) frequency bands. In particular, TVWS corresponds to the unused TV channels between active channels in the UHF and VHF spectrums.

TV channel availability can vary across both space and time. As a result, transceivers communicating using the TVWS spectrum may have to hop between different frequencies. Moreover, the TVWS spectrum is not continuous and single channel capacity using TVWS may not be enough to allow for satisfactory communication between some types of devices, such as Internet of Things (IoT) devices. Additionally, TVWS is sensitive to interference when the signal is low, resulting in use of the TVWS mostly for broadband communication today.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for communication using dynamic spectrum access comprises selecting from a list of available dynamic spectrum access channels, a set of channels as active channels, the active channels comprising uplink channels and downlink channels, and distributing the active channels among a plurality of base station radios of a base station. A different channel is assigned to different base station radios of the plurality of base station radios. The computerized method further comprises assigning at least one uplink channel and at least one downlink channel to a plurality of client devices based on locations of the plurality of client devices, wherein at least some client devices of the plurality of client devices have active channels in common. The computerized method also includes grouping at least some of the client devices having the active channels in common on shared channels that include the active channels and at least one backup channel and assigning time slots to the client devices in the group to allow communication between the client devices by scheduling the communication using the shared channels to allow channel hopping between the active channels and the at least one backup channel.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein.

Corresponding reference characters indicate corresponding parts throughout the drawings. In the figures, the systems are illustrated as schematic drawings. The drawings may not be to scale.

DETAILED DESCRIPTION

Figure 1:
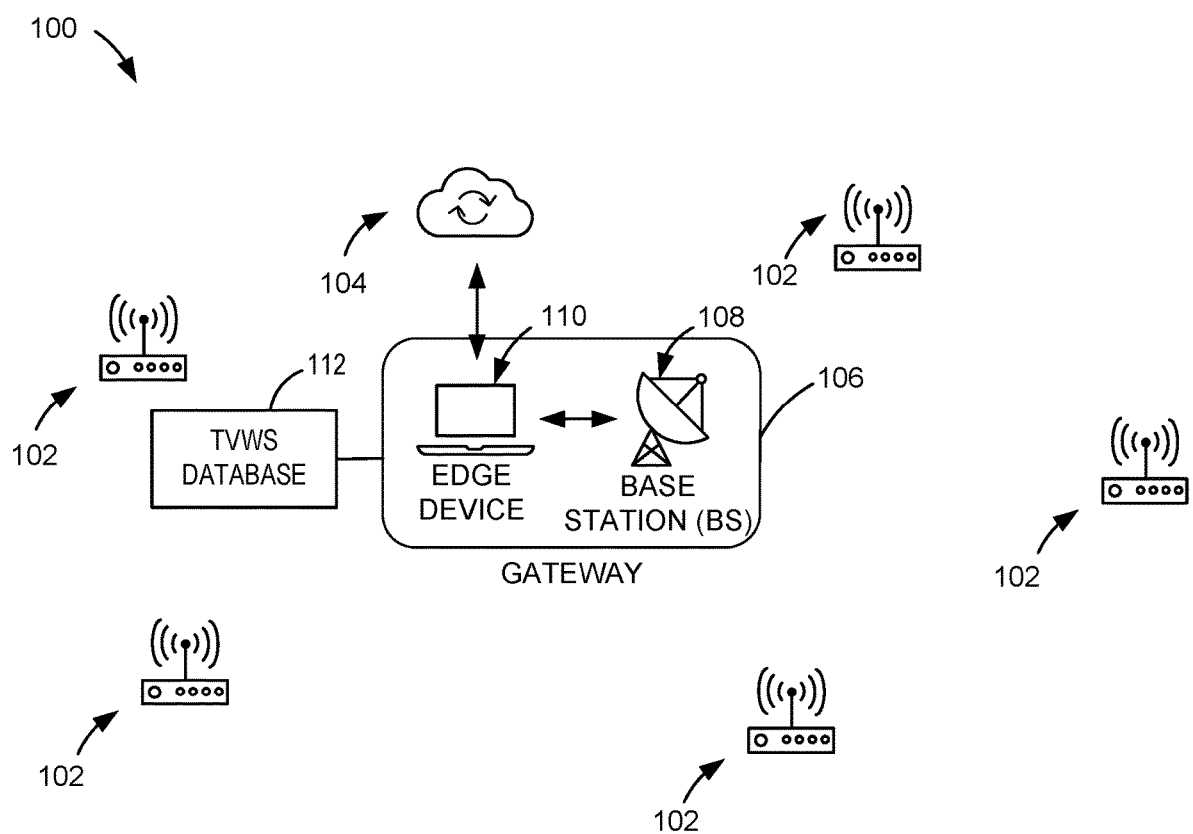
FIG. 1 is a block diagram illustrating communication between a base station and clients according to an example.

The computing devices and methods described herein are configured to communicate using dynamic spectrum access, which in various examples, includes using the television (TV) white space (TVWS) spectrum. With the disclosure, communication between endpoint devices (e.g., clients) and a corresponding base station for use in an edge Internet of Things (IoT) environment makes use of a dynamic spectrum, such as the TVWS spectrum, without having the limitations typically introduced when communicating using the TVWS, in various examples. However, the present disclosure in not limited to use of the TVWS, but can be implemented in other dynamic spectrum access applications, such as the citizens broadband radio service (CBRS), among others. Additionally, the present disclosure can be implemented with other spectrums, as well as with different types of networks, such as 'mesh' networks (e.g., where networks can self-form and self-heal, with nodes connecting directly to other nodes).

Various techniques employed on an IoT device are designed to make use of the TVWS spectrum to perform computing activities, and to handle spatial variation and temporal variation. For example, the TVWS spectrum can exhibit spatial variation since a channel available at one node may be occupied by a primary user (e.g., TV, wireless microphone, etc.) at another node. The TVWS spectrum is also not contiguous. Some channels may be occupied by primary users, thus causing the spectrum to be fragmented. Additionally, temporal variation is possible since an available spectrum may be occupied at a later time by a primary user and vice versa. On the other hand, the number of available channels in the TVWS spectrum is significantly higher compared to the industrial, scientific, and medical (ISM) band. Hence, the TVWS spectrum allows comparatively higher bandwidth for data transmission.

In some examples, to enable an IoT network over TVWS, and with respect to the spatial variation, the present disclosure uses the known location of each client device (e.g., each client IoT device includes a global positioning system (GPS) module or processor and sends geographic location information to the gateway) and accesses a TVWS database (available to the gateway) to query for the available channels based on the location. In another example, the base station divides an entire communication area into a grid and includes the channels available in each grid within a beacon signal. As such, the client knows the grid the client is in, and selects the corresponding channel for operations. And, with respect to temporal variation, intelligent hopping is used across the available channels. For example, the base station hops across the available channels, and if the client device loses connectivity, the client device attempts transmission in the next channel. As a result, devices that otherwise cannot be satisfactorily used for such environments (e.g., IoT devices) are configured to use the TVWS spectrum for longer range, higher capacity, lower power consumption communications (e.g., communication in remote locations). For example, with the present disclosure, long range communication for IoT networks is enabled.

For example, with the present disclosure, IoT devices are able to operate at the lower frequencies in the TVWS (within the ultra-high frequency (UHF) and very high frequency (VHF) bands) and for longer range communications (e.g., tens of miles), while providing large amounts of bandwidth, which can be 6 megahertz (MHz) per TV channel in some configurations. As such, a single TVWS base station can support large-scale IoT at very long-range when configured according to the present disclosure.

FIG. 1 illustrates a system 100 in accordance with one example. The system 100 allows a plurality of client devices 102, such as IoT devices, to communicate with a cloud-based device 104 through a gateway 106. For example, the client devices 102 can be co-located (at least part of the time) and are configured to communicate locally over one or more local networks using the TVWS and ultimately can communicate with external devices, such as cloud-based devices 104, via one or more external networks through the gateway 106. In the illustrated example, the system 100 is configured as a TVWS network that allows for communication between, for example, IoT devices.

The gateway 106 includes a base station 108 and an edge device 110 in the illustrated example. The client devices 102 and the base station 108 are configured in some examples to have one or more multi-narrowband transceivers. As should be appreciated, the client devices 102 and base station 108 can be variously configured to operate in accordance with the communication techniques described herein.

In one example, the base station 108 is configured to have a working frequency from 150 MHz to 960 MHz, which covers most VHF and UHF TV channels, 433 MHz, 800/900 MHz ISM band and/or other licensed frequency bands. It should be noted that with the present disclosure, the base station 108 and the client devices 102 are configured for TVWS network communication having spatio-temporal variation. In one example, communication and control ports are provided and include one or more of: universal asynchronous receiver/transmitter (UART), universal synchronous/asynchronous receiver/transmitter (USART), universal serial bus (USB), serial peripheral interface (SPI), and/or multiple general purpose input/output (GPIO).

In an IoT environment, the edge device 110 performs processing at the "edge" of the network (e.g., within the gateway 106). Thus, in one example, the processing for performing transmission is done by the gateway 106, such as accessing a dynamic spectrum access database, which in the illustrated example is a TVWS database 112 as described in more detail herein. However, the edge device 110 or the computing to perform TVWS communication as described herein, in some examples, is performed (or partially performed) at any location near the gateway 106, which is not necessarily within the gateway 106 (e.g., a local computing device connected to the gateway 106). As such, the processing or partial processing to allow for TVWS transmission in these examples is performed outside of the gateway 106. Additionally, it should be noted that the dynamic spectrum access database can be any type of database having channel availability information for a dynamic spectrum frequency range.

In one example, each client device 102 (and the base station 108) includes a GPS device that provides location information (e.g., geo-location information). As described in more detail herein, the location information is used when configuring communication between the various devices. The base station 108 is powered using one or more power sources, such as a power over ethernet (PoE) power supply in some examples, or other suitable sources of power.

The client devices 102 in some examples also include an interface extension board and connect to different sensors (e.g., IoT type sensors) in some examples. It should be noted that power for each of the client devices 102 can be provided using a solar panel, a battery (e.g., direct current), or alternating current (AC) power, among others. The power source is selected in some examples based on the application or environment in which the client device 102 operates.

Thus, devices in the system 100 are configured to form a TVWS IoT network in some examples. For example, a "check before talk" configuration is used that allows for an IoT protocol for TVWS. In one configuration, TVWS for an IoT network deployment includes a scheduling algorithm, a base station design, and a grid based positioning technique and GPS based time-synchronization technique. The scheduling algorithm supports dynamic channels with respect to spatio-temporal variation, which uses different channels for uplink and downlink transmission considering the location-based channel availability in TVWS spectrum. The scheduling also includes techniques using alternative active channel, hopping, and buffer slot reservation to adapt to the variation of channel quality and availability over the time.

In other examples, the devices in the system are configured in a 'mesh' network. Mesh networks are a type of ad-hoc network (with an infrastructure network being another type of network). In mesh networks, nodes receive and forward messages, allowing messages to be passed from node to node. As a result, mesh networks can be established over a relatively wide area, which can be implemented using the TVWS spectrum as disclosed herein. Additionally, because connections between nodes can be defined or adapted ad hoc, communication over the mesh network can continue despite communication failures between one or more of the nodes.

The base station design facilitates the channel allocation for endpoint devices. For example, different client devices 102 can be assigned different channels based on the locations of the client devices 102. Additionally, multiple channels are available for data transmission (i.e., more bandwidth) in some examples. To take advantage of these characteristics, a multi-radio base station 108 is used in various examples, wherein all the radios are synchronized among each other. In operation, the radios synchronously hop across the channels assigned for the client devices 102. It should be noted that the number of radios in some examples is based on the size of deployment, wherein more radios enable more bandwidth utilization. Channel selection and distribution, as well as channel hopping and scheduling are performed in various examples. In one example, with the system 100, the number of messages communicated back and forth between the devices 102 and base station 108 is reduced.

The grid based positioning technique and GPS based time-synchronization technique register a new endpoint device in the network to accommodate FCC (Federal Communications Commission) requirements. For example, according to FCC regulation, a TVWS radio cannot start readily transmitting over an arbitrary TV channel. That is, there are certain TV channels allowed for transmission in a region, and there is a regulation on the amount of transmit power. In one example, the gateway 106 queries the TVWS database 112 for a list of permitted TV channels. As a result, the TVWS radios (client devices 102 and base station 108) are controlled to only transmit over the list of permitted channels. It should be appreciated that the list of permitted TV channels is updated by the gateway 106 on a regular basis.

In one particular example, with the system 100, every client device 102 (defining a client node) has a GPS module onboard. Before transmitting data, each client device 102 shares a geo-location of the client device 102 with the gateway 106. The gateway 106 then queries the TVWS database 112 with the GPS location of the client device 102 and receives a list of available channels based on the geo-location of the client device 102. The gateway 106 updates the client device 102 with the available channel list for the client device 102 in the geo-location thereof. In some examples, the channel list for the client device 102 is a sub-list of the total available channels. For example, a maximum channel list is transmitted to the client device 102, which in one configuration is three channels. However, additional or fewer channels can be provided, such as based on the density of devices in an area, the geographic location, etc. Additionally, in some examples, the entire channel list is transmitted to the client device 102.

In some applications, the deployment of the system 100 includes a mobile client device 102 (mobile client nodes), such as a node on a tractor in a farm. In this example, as the location of the tractor changes over the time, the channel availability also changes for the mobile client device 102. In this type of deployment, a predictive location determination and available channel list is determined. For example, the mobile client device 102 caches the channel list for possible future locations. Based on a current and previous GPS location of the client device 102, a probable future position is estimated, such as using machine learning. For example, a machine learning model as used in machine learning technology generates predictions of future locations of the mobile client device 102. In some examples, real-time predictions are generated. It should be appreciated that different prediction techniques and methods can be used, such as any algorithm or process that allows for prediction or approximation of future location information.

In some examples, the GPS location is updated at defined distance intervals, which are determined based on location requirements. In one example, the GPS location is updated at every 50 meter (m) change in distance. However, other distances are contemplated. The GPS update interval defines an accuracy level for the location prediction or estimation (e.g., more frequent updates results in more accurate location prediction or estimation). From the rapid location change, the gateway 106 also obtains information about the mobile client device 102. It should be noted that to facilitate communication with the mobile client device 102 (mobile node), in one example, the gateway 106 assigns more frequent hopping across the available channels for the mobile client device 102.

Channel Hopping

With respect to channel hopping, the quality of a TVWS channel can vary over time. Hence, the TVWS channel that is being used for the communication between gateway 106 and the client device 102 can be affected or blocked. The present disclosure uses channel hopping to reduce or avoid the likelihood of loss of communication resulting from affected quality or blocking of some channels. For example, each time the client device 102 initiates communication through sending an uplink message to the base station 108, the client device 102 expects a downlink reply from base station 108. If the client device 102 does not receive the downlink reply (e.g., receive a downlink packet), the client device 102 retries again after a certain time period, which can be random or defined. If a client device 102 misses a certain number of downlink packets, the client device 102 marks the present channel as noisy.

Using information about the channels, such as based on the uplink/downlink process described above, the radios of the base station 108 are configured to hop across all the available channels (for all the client devices 102), such as sequentially or in a defined pattern. In one example, the base station dwell time on each channel is equal and fixed. However, variable dwell times can be used, such as based on the strength of the channel, etc.

If a client device 102 identifies a channel as noisy and/or blocked, the client device 102 starts hopping across the channels shared with the client device 102 from the base station 108 (e.g., the channel list transmitted to the client device 102 from the base station 108). On each channel, the client device 102 attempts to send data to the base station 108. Before sending the data, the client device 102 performs carrier access detection (CAD) in some examples. CAD uses carrier-sensing to defer or change transmissions. This can be used in combination with collision detection in which a transmitting device (transmitting client device 102) detects collisions by sensing transmissions from other transmitting devices (client devices 102) while the client device 102 is transmitting a frame. Based on the CAD results, the client device 102 either sends data, delays the data send, or does not send the data. It should be noted that once the client device 102 connects with the base station 108, the client device 102 starts communicating with the base station 108 over the selected channel.

It should be appreciated that different configuration settings are defined in various examples. In one example, the dwell time on a channel for a client device 102 is twice that of the base station 108. However, other relative values are contemplated.

Channel Sensing

Figure 2:
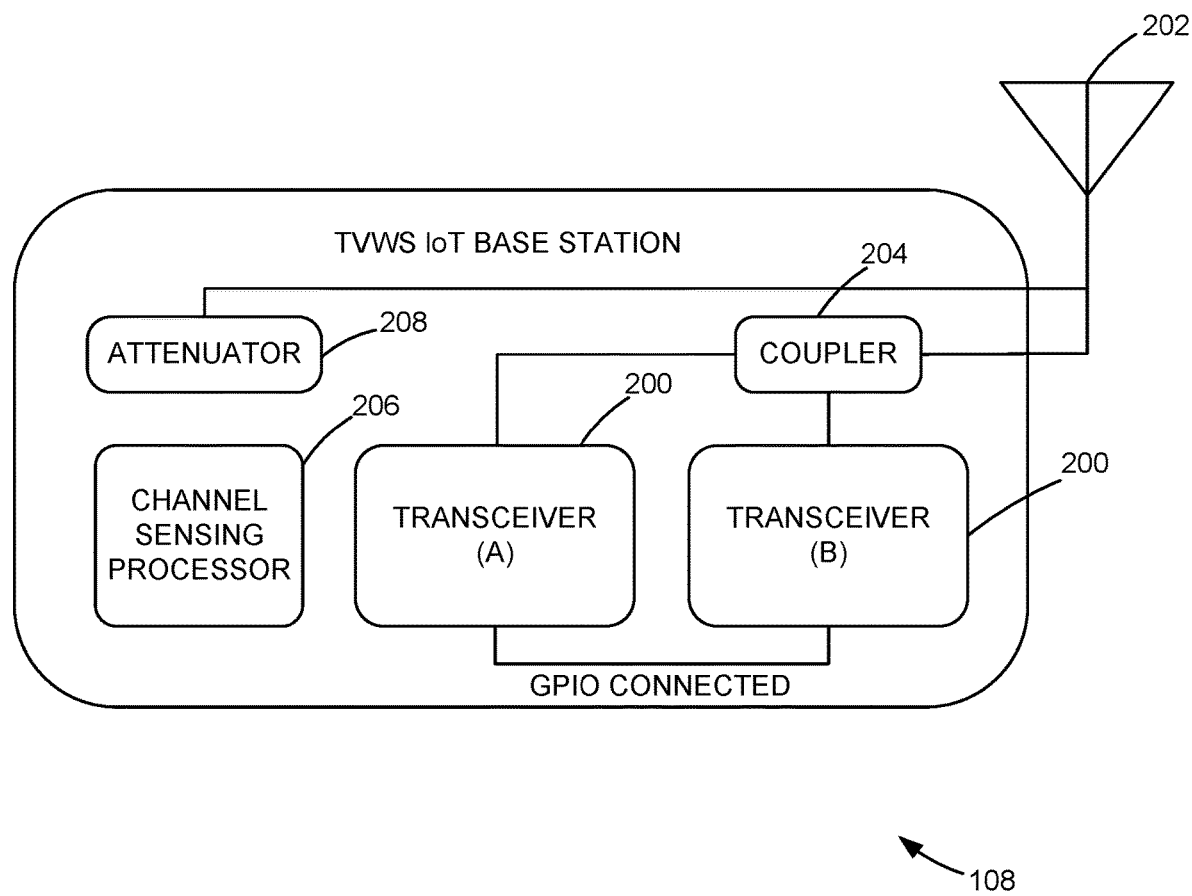
FIG. 2 is a block diagram of a base station according to an example.

With respect to the base station 108, one configuration is illustrated in FIG. 2. The base station 108 includes a plurality of transceivers 200 (two are shown) that are interconnected with each other and each connected to an antenna 202 through a coupler 204. In one configuration, one input/output (I/O) of each of the transceivers 200 are connected together using a general-purpose input/output (GPIO) pin of each of the transceivers 200 to allow communication there between. The interconnection of the transceivers 200 is configured to allow synchronization of the operations of the transceivers 200. In one example, the interconnected GPIO pins of the transceivers 200 are assigned for synchronization operations.

A channel sensing processor 206 is connected to the antenna 202 through an attenuator 208. The channel sensing processor 206 is a processor programmed with program code or other computer-executable instructions to perform operations. For example, the channel sensing processor 206 is configured to assess channel quality, for example, to determine the channels having no interference, lower interference, no present usage, etc. Based on the assessed quality, channels are added to an available channels list, such as a channel whitelist. That is, channels having an interference level or other characteristic below a defined threshold (e.g., a threshold that allows satisfactory communication over the TVWS channel without interfering with TV users) are added to an available list of channels provided to the client devices 102 as described herein. It should be appreciated that the sensing by the channel sensing processor 206 can be performed using any sensing techniques in the channel quality determination technology. Thus, in various examples, the present disclosure allows for inferring the channels to use, which includes a determination of channel quality when performing channel selection and assignment.

In operation, the plurality of transceivers 200 enables communication across multiple channels simultaneously. That is, with more than one transceiver 200, communication over different frequencies or frequency ranges in the TVWS frequency spectrum can be performed.

Thus, the base station 108 allows for communication over the TVWS spectrum, and having GPS functionality on board, as well as spectrum/interference sensing, facilitates identifying available TVWS channels. That is, using one or more of the techniques described herein, a TVWS network, such as for IoT devices, can be implemented without interfering with existing TVWS usage.

In one example, a scheduling mechanism allows for the formation of the TVWS network for the client devices 102. The scheduling mechanism includes at least one of channel selection and distribution, and channel hopping and scheduling, in one configuration. An example of a channel selection and distribution configuration is next described.

Channel Selection and Distribution

Figure 3:
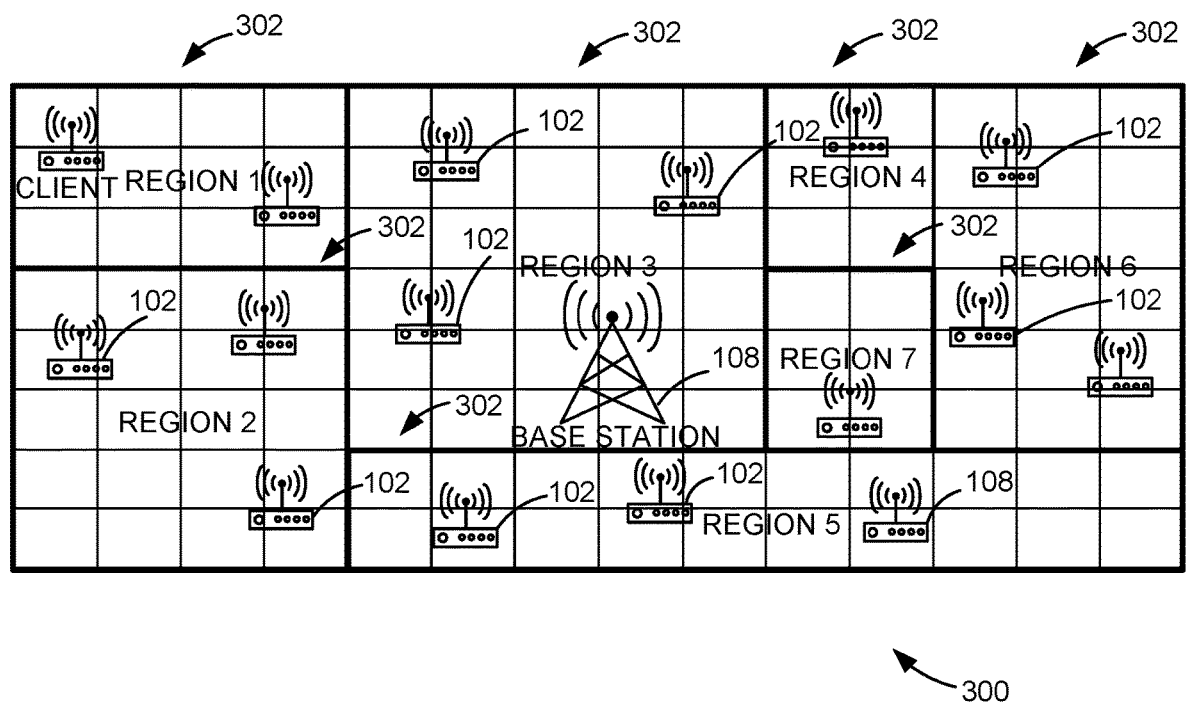
FIG. 3 is a block diagram of deployment region according to an example.

In accordance with FCC regulations, each TVWS radio transmits over the channels available at the location of the TVWS radio, such as within the client devices 102. As should be appreciated, a channel may be available in a region, not only at a single point. As such, in an example configuration, the whole deployment region is defined as an area 300 (e.g., rectangular area) as shown in FIG. 3. A grid-wise channel availability is thereby defined, wherein in each region 302 (illustrated as smaller rectangular regions), a distinct group of channels are available for the uplink transmissions by end-devices, namely the client devices 102. The area 300 can be a large area (e.g., 20 kilometers (km) by 20 km) wherein client devices 102 likely will not have the same channel availability. As will also be described herein, dynamic scheduling is also performed in some examples.

It should be appreciated that the size and shape of the area 300 may be rectangular, oval, circular, or any other size or shape capable of being subdivided into smaller regions. Further, it should be appreciated that the number, size, and shape of the regions 302 can be varied. For example, while the size and shape of the regions 302, as well as the number of the regions 302 (seven in the illustrated example), are shown having a particular configuration, the configuration is only for illustration. The size, shape, and/or number of the regions 302 can be selected based on different criteria or factors, such as the number of client devices 102 in a geographic location, the distance from the base station 108, the TVWS quality in the geographic location (e.g., mountains or hills obstructing transmission, available TVWS channels), etc.

In the illustrated example, the area 300 is divided into smaller rectangular grids defining the regions 302, which are also referred to as unit grids. In one example, the regions 302 are determined and defined by channel availability, That is, the regions 302 are defined such that at least one channel is available in each region 302, a maximum number of channels is available in each region 302 or certain regions 302, etc. It should be appreciated that the identification of groups or clusters of client devices 102 within geographic regions are used in some examples when defining the regions 302. For example, a determination is made as to the average number of client devices 102 within a geographic area, which is used to define a size of the regions 302 in some configurations. In some example, the regions 302 are defined by a geocode system or other means.

Thereafter, a channel available in each a region that includes one or multiple unit gird(s) is identified, such as based on the available channel list described herein. That is, the base station 108 has access to the TVWS database 112 (shown in FIG. 1). Thus, using the TVWS database 112, available channels are identified for a deployment region, which is the area 300 in this example. In one example, channel selection is performed to maximize bandwidth utilization (e.g., use more available channels). It should be appreciated that the number of base station radios (or base stations 108) in the area 300 is used as a constraint. Although, one base station 108 is shown, multiple base stations 108 can be included within a deployment region.

The base station 108 scans the arbitrary number of available channels, C, to evaluate quality, and a channel is added to the whitelist based on a predefined threshold of quality metrics (RSSI, SNR), in one example, as follows:

$$\text{Total whitelist channels (Wc): } 1 \leq W_c \leq C \qquad \text{Eq. 1}$$

If $W_c$ channels are available, then $AW_c = \lfloor W_c/2 \rfloor$ is used as active channels for the system, and the remainder of the channels are reserved as backup channels. These backup channel define fallback channels or bandwidth, which may be used when the active primary channels are blocked or noisy.

It should be noted that the active channel list contains both uplink (client device 102-base station 108) and downlink (base station 108-client device 102) channels. Uplink channels must be available for the transmission at the location of the client devices 102. However, downlink channels may or may not be available for the transmission at the location of the client devices 102. But, downlink channels must be available for the transmission at the location of the base station 108.

Thereafter, assignment of the $W_c$ channels includes distributing the channels among the radios of the base station 108 if the base station 108 has multiple radios. The channels are distributed among the radios, in one example, such that the dwell time of any two channels for a radio of the base station 108 radio do not overlap. In one example, each radio of the base station 108 is assigned one or multiple active channels, as well as backup channels.

With respect to the selection and distribution of the channels, in one example, each client device 102 can be served by one or multiple base station radios. But, in this example, each client device 102 is assigned at least one active channel and at most two active channels for uplink transmission. Similarly, for downlink reception, each client device 102 is assigned at least one channel and at most two active channels. If a client device 102 is assigned multiple active channels, the client device 102 sequentially hops across the channels while transmitting data in an assigned time slot. Other number of active channels can be assigned, such as not more than three.

Each client device 102 is also assigned one or more prioritized backup channels. The backup channels can be used, for example, when the assigned channels (active primary channels) become noisy or otherwise are not providing acceptable transmission (e.g., transmission too lossy). It should be noted that the backup channels in some examples are stored in memory of the client device 102. In various examples, the active channel list, as well as backup channels, can be changed "on the fly" depending on the communication with the base station 108 (e.g., quality of communication with the base station 108).

Channel Hopping and Scheduling

With respect to channel hopping, in one example, a time slot structure is defined to allocate talk time among all of the client devices 102 (e.g., all client devices 102 in a region 302). In one example, a discrete time quantity is defined as $t_q$ (quantum) and each time slot is a multiple of this discrete time quantity. A client device 102, which defines a client node, can only transmit during time slot ($N_{Client\ ID}^{channel\ ID}$) assigned to the client device 102 and over the assigned one or more channels. In one example, the time slot length assigned for a client device 102 is dependent on a throughput requirement of the client device 102 and radio configuration.

A time slot has a duration of 2T in some examples, where T is the worst-case time needed for one uplink transmission and one downlink transmission. In this time slot, uplink and downlink transmissions are performed on corresponding channels and performed on two different channels if available. It should be noted that if multiple uplink and downlink channels are available, the channels are coupled together.

For each client device 102, a period ($t_p^{client\ ID}$) is defined, which is the time gap between two consecutive slots assigned for the client device. This period is not changed without notifying the client device 102.

Each client device has a start time, $T_s^{client\ ID}$ (unix timestamp), which represents the time slot when the client device 102 makes a first data transmission attempt. If the client device 102 is assigned multiple active channels, the client device 102 sequentially changes the transmission/reception channel in every consecutive assigned slot (e.g., round robin configuration). For example, if a client device 102 is assigned two active channels—$C_1$, $C_2$, in the first assigned transmission slot, the client device 102 transmits over $C_1$; in the next slot, the client device 102 transmits over $C_2$; and in the next slot, the client device 102 again transmits over $C_1$. It should be noted that two consecutive data transmission attempts are made on different active channels in various examples.

Figure 4:
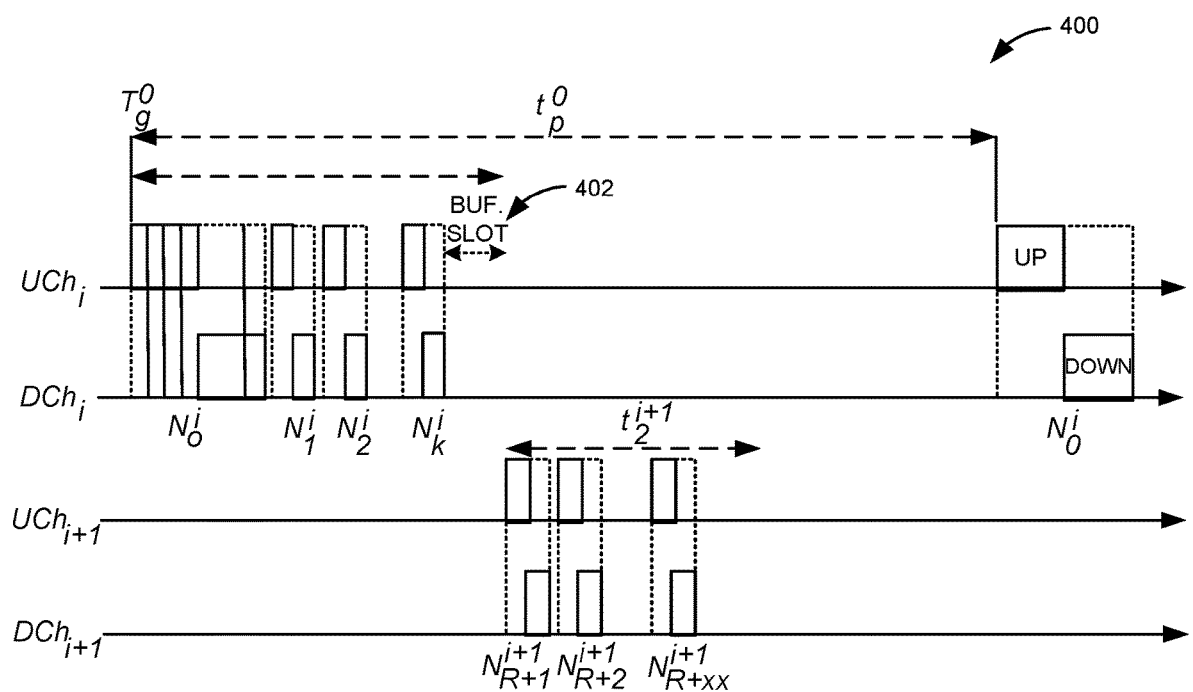
FIG. 4 is a timing diagram according to an example.

With respect to the base station 108 and channel hopping, a single base station radio can serve multiple channels (uplink and downlink) using a channel hopping schedule as illustrated in the timing diagram 400 of FIG. 4, wherein U(D)ch=Uplink(Downlink) channel, N=client node, $T_S$=initial start, $t_d$=dwell time, $t_p$=period. In this example, one base station 108, and one active uplink and downlink channel are assigned per client device 102. However, two radios both serve on the same channel. Each uplink channel is coupled with only one downlink channel, and each downlink channel can be served by only one base station radio (e.g., transceiver 200 shown in FIG. 2).

The dwell time ($t_d^i$) of the base station radio on an uplink channel defines the time the radio stays on an uplink channel to serve a group of client devices 102. For each corresponding uplink channel, the base station radio dwell time includes a buffer slot 402 to accommodate new clients "on the fly". For example, when a new client device 102 enters a region 302, the buffer slot 402 allows for communication within the region 302 without having to reconfigure the hopping schedule. It should be noted that the number of dwell time overlaps among channels is not more than the number of base station radios available, in one example.

In operation, in one example, as the active channels are assigned based on the location of the client device 102, multiple clients can have two active channels in common. In this case, the client nodes for these client devices 102 are grouped based on the same $t_p$. Multiple client devices 102 can also share one active channel in common. In this case, different approaches can be used based on the number of base station radios available and bandwidth requirements. For example, all the client devices 102 are grouped based on the shared channel and the slot assignment is decided, as well as $t_p$ accordingly. This approach increases the reliability, however, decreases the bandwidth utilization. In another approach, if multiple base station radios are available, the client devices 102 that have two channels in common are grouped together, and other client devices 102 are assigned only one active channel. This increases the bandwidth utilization, however, decreases the reliability.

Figure 5:
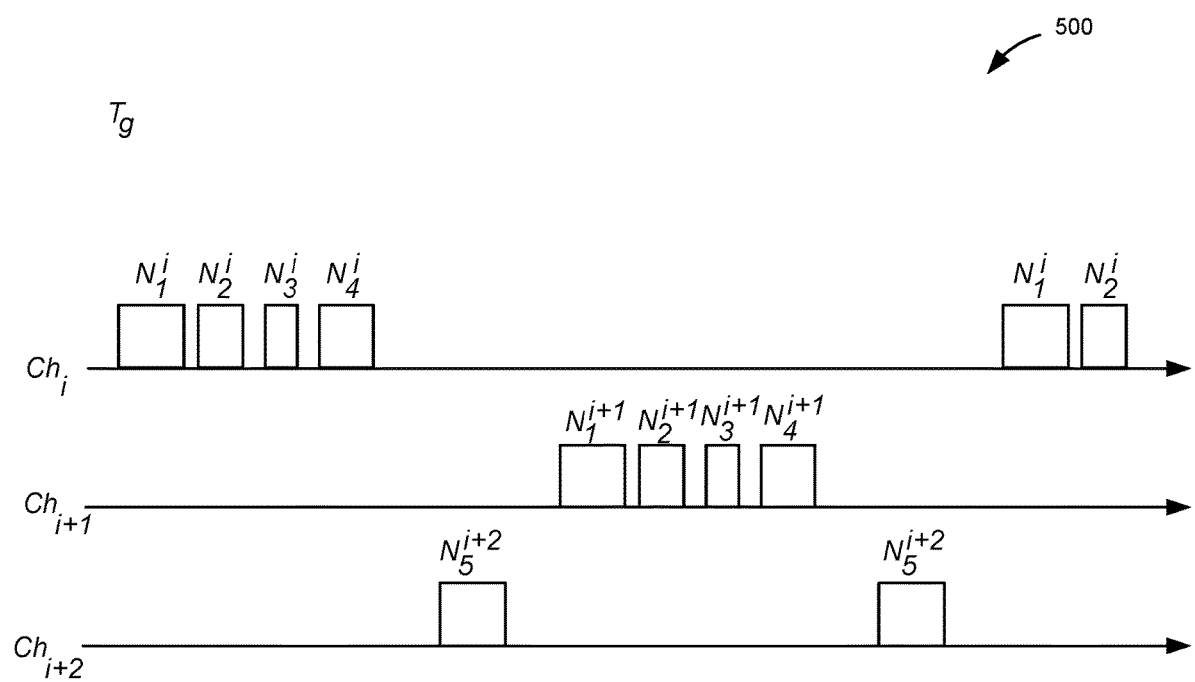
FIG. 5 is a timing diagram according to another example.

For example, FIGS. 5-8 illustrate different examples of channel hopping and scheduling when one or more client devices 102 share a channel. The timing diagram 500 of FIG. 5 illustrates channel hopping and scheduling wherein: #Radio=1, #Channel=3, Ch/C=2. That is, one client device (N5) and four other client devices share a common channel ($Ch_{i+1}$). In the illustrated example, N5 is assigned only one active channel.

Figure 6:
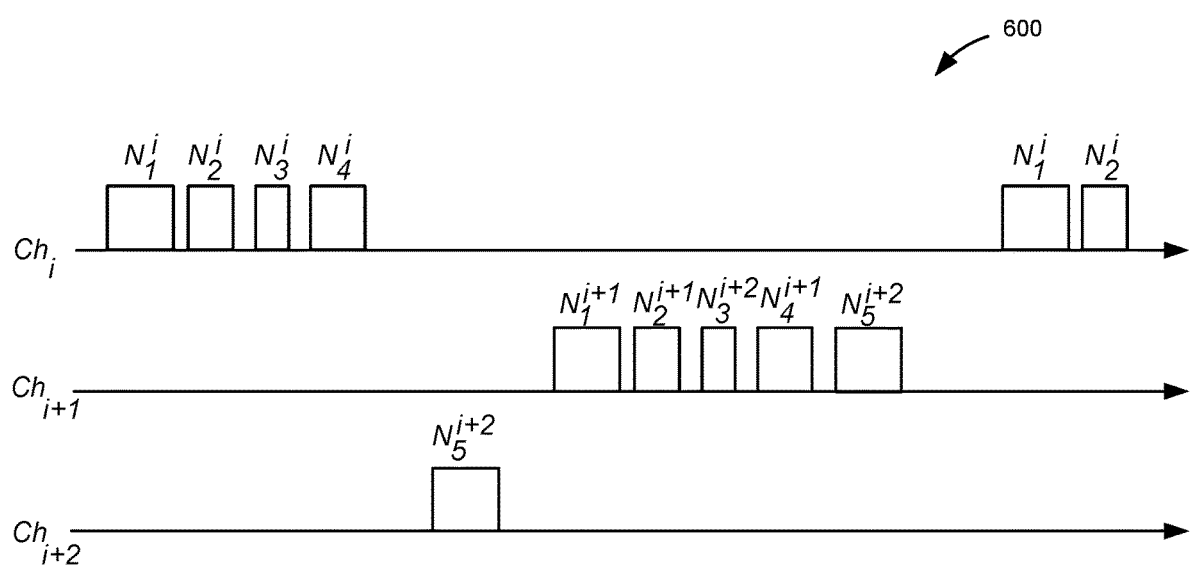
FIG. 6 is a timing diagram according to another example.

In another example, wherein: #Radio=1, #Channel=3, Ch/C=2, as shown in the timing diagram 600 of FIG. 6, $N_5$ is assigned two active channels and the dwell time of $Ch_{i+1}$ and $Ch_{i+2}$ are made equal to the $Ch_i$. It should be noted that the approaches illustrated in FIGS. 5 and 6 do not differ much when there is only one base station radio to serve.

Figure 7:
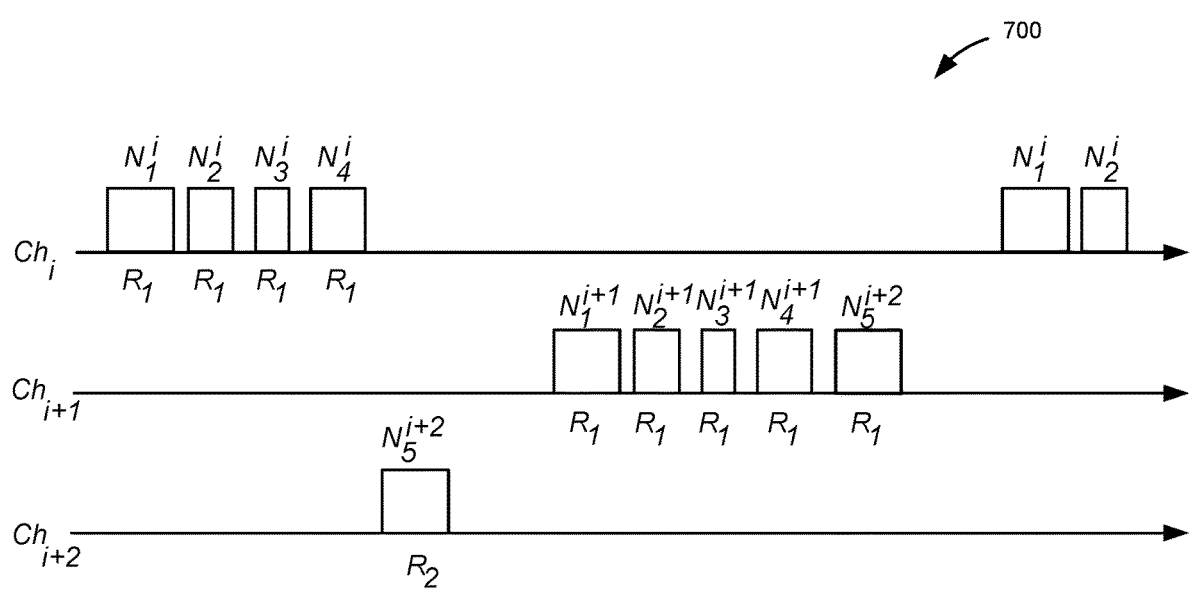
FIG. 7 is a timing diagram according to another example.

In another example, wherein: #Radio=2, #Channel=3, Ch/C=2, as shown in the timing diagram 700 of FIG. 7, there are two base station radios, the same approach is used—assigning $N_5$ two active channels and making the dwell time of $Ch_{i+1}$ and $Ch_{i+2}$ equal to the $Ch_i$.

Figure 8:
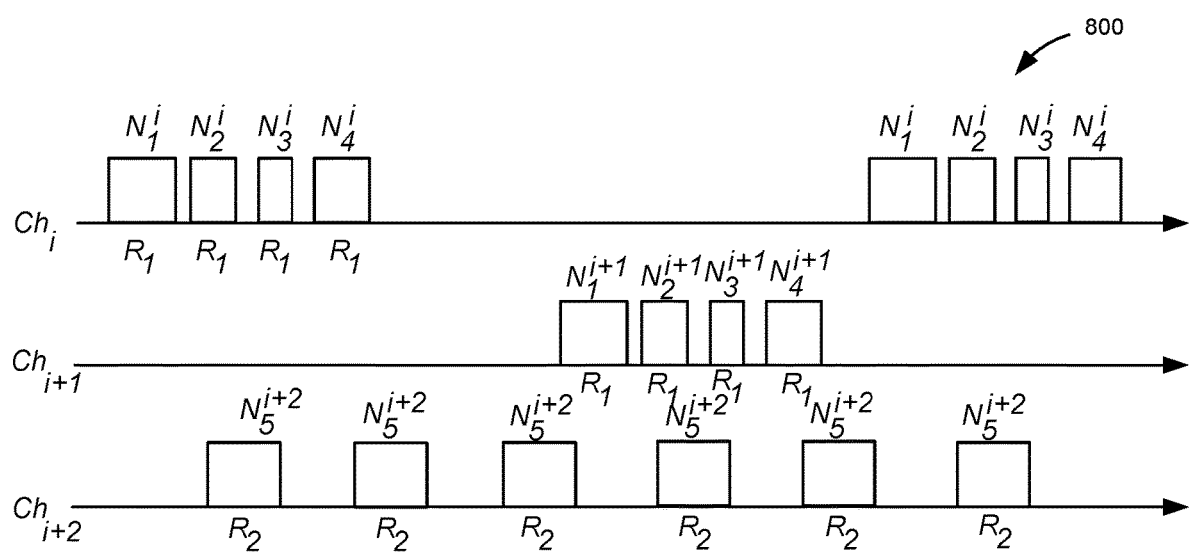
FIG. 8 is a timing diagram according to another example.

In another example, wherein: #Radio=2, #Channel=3, Ch/C=2, as shown in the timing diagram 800 of FIG. 8, there are two base station radios. In this example, one active channel is assigned to $N_5$ to increase the bandwidth utilization for all the nodes. This illustrates the trade-off between higher bandwidth and reliability.

In one example, channel hopping of switching, which can be performed by the client device 102 or the base station 108, such as switching channels if the channel becomes unavailable or noisy, includes determining when to switch channels and having the client device 102 and base station 108 on the new channel to resume transmission.

The channel switching determination may be made using a counter. For example, the process includes both the base station 108 and the client device 102 keeping two counters (count-up and count-down) saved in local memory for both uplink and downlink packets. This counter is also shared between the base station 108 and corresponding client device 102 as a part of uplink/downlink packets. The mismatch between the shared counters and local counters reflects the missing packet numbers.

With respect to determining whether to switch channels, the base station 108, in one example, queries the TVWS database 112 for the available channels. In addition, the base station 108 keeps scanning (as described herein) the existing channels to keep the channel quality status updated. The base station 108 also keeps track of the missing downlink (plus uplink) packets based on the count-up and count-down counters. If a client device 102 is alternatively transmitting over two channels, the base station 108 is able to determine whether the missing packet is on a particular channel. The base station 108 also monitors the status of the other client devices 102 on the same channel to determine the channel quality. For each client device 102, the base station 108 tracks the previous history of packet exchange frequency for calculating the interval thereof.

With respect to determining whether to switch channels, the client device 102, in one example, keeps track of the missing downlink packets to estimate the channel status. If a client device 102 is assigned two active channels, and the client device 102 does not receive a response from the base station 108 on a particular channel, the client device 102 retries the transmission in the next slot on the next available active channel. This failed response gets reflected in the local count-up/count-down counters. Hence, both the base station 108 and the client device 102 get to assess the channel quality.

Based on the number of missing downlink packets, and mismatch in local and shared packet counters, the client device 102 decides to switch channels, in one example, as next described. If the client device 102 has two channels and determines one channel is noisy, the channel handover (noisy to white) is seamless, because the base station 108 and the client device 102 make a decision about the noisy channel over the white channel. If the client device 102 has one active channel or both of the active channels get noisy, the client device 102 makes a decision after a certain number of packet misses.

When switching channels, the base station 108, in one example, keeps the client devices 102 updated on the available channel list and quality using medium access control (MAC) commands. The base station radio moves to a backup channel on the same slot for one or multiple client devices 102 when the base station 108 decides to switch channels based on the decision-making criteria described herein. The base station radio remains on a certain backup channel at least for a period of time twice that of the transmission interval of the client device 102. The base station 108 stops hopping if the base stations 108 receives a response from the client device(s) 102 or switches to the next backup channel.

The client device 102, in one example, after making the decision to switch channels, keeps hopping across the backup and active channels on the given slot. If the client device 102 does not receive a response from the base station 108 for a defined period, the client device 102 enters an "aggressive" mode and behaves like a new client device 102.

In some examples, uplink channel capacity is improved, alternatively or in addition to downlink channel capacity. For example, if the client devices 102 includes both narrowband and broadband devices, capacity planning is performed per device to ensure good uplink capacity or improve uplink capacity, such as using aggregated acknowledgments are described herein. That is, in some examples, more bandwidth is allocated to the uplink side than the downlink side.

Acknowledgement (ACK) Signals

In some example, bandwidth utilization efficiency is increased by grouping ACK signals for client devices 102 on the same channel. For example, at the end of the buffer slot 402 (shown in FIG. 4), a grouped ACK slot is assigned. All the client devices 102 follow the same modulation configuration to receive the ACK signal and the grouped ACK signal follows a block-based packet structure to organize information for each client device 102.

With respect to communication within the system 100, control messages, such as the MAC commands, are used. MAC commands are the control messages related to the MAC layer (channel change, slot change, etc.). Every uplink message is followed by a downlink ACK. The ACK contains the MAC commands specific to the client device 102. If an ACK is not enough to convey MAC commands, a bit in the MAC command asks the client to send a dummy uplink message in the next assigned slot. A downlink beaconing slot is also provided in the buffer slot 402, wherein multicast MAC commands can be communicated. However, it should be noted that a client device 102 can skip that beaconing slot if the client device 102 has already received the ACK in the corresponding transmission slot.

Bootstrapping

With respect to adding a new client device 102, a client bootstrapping process is performed in some examples. After a hot start, a new client device 102 is not aware of the channel availability and schedule. The new client device 102 cannot make any transmission attempt without knowing the available channel at the location of the new client device 102. GPS time is used to synchronize the new client device 102 with the network and beacon from the base station 108 to announce the region 302 in which the new client device 102 is located and the corresponding channel availability.

With respect to the new client bootstrapping, in one example, the base station 108 selects one distinct channel per region 302. The base station 108 embeds information per region 302 in the beacon as follows: (i) coordinates of the region 302, (ii) available channel, and (iii) free slot in the corresponding channel (i.e., buffer slot 402). The base station 108 enters in a beaconing period on a regular interval following a UNIX timestamp, wherein this beaconing period timestamp is known to all the client devices 102 (both old and new), and all the transmissions freeze during this time. In the beaconing period, the base station 108 hops across the fixed downlink channels on which the base station 108 can transmit. On each channel, the base station 108 sends one beacon and hops to the next channel. If the base station 108 has multiple radios, the base station 108 sends the beacon on multiple channels in parallel. After the beaconing period, normal transmission resumes following the predefined schedule (channel hopping schedule). Once bootstrapping is complete, the base station 108 starts increasing the buffer slot 402 that the base station 108 assigned to the new client device 102. If the buffer slot 402 is full, the base station 108 creates a slot first and then onboard. The base station 108 also communicates with the new client device 102 to indicate to the new client device 102 to wait for a certain period before the next join-request.

With respect to the new client bootstrapping, in one example, the new client device 102 synchronizes the time using GPS after the hot start. The new client device 102 has the list of beaconing channels already stored (sent from the base station 108 as described herein, that is, preloaded). Before entering in the beaconing period, the new client device 102 obtains the location of the new client device 102 using GPS. The new client device 102 enters in the beaconing period and starts hopping across the stored channels, wherein the new client device 102 listens on each channel for (#channel*Max Beacon Packet Transmit Time). During the beaconing period, the new client device 102 determines the region 302 in which the new client device 102 is located and the corresponding available channels. The new client device 102 has a random delay assigned thereto before transmitting in the buffer slot 402 to address any hidden-node issue. The new client device 102 also has CAD implemented to avoid collision. If the new client device 102 receive a slot-unavailable notification, the new client device 102 waits before the next try.

Thus, with the present disclosure a TVWS deployment can be performed, such as a TVWS network deployment for IoT devices. In one example, during deployment, the base station 108 knows prior to deployment the number of client devices 102 and how many radios will be present. The defined active channels are distributed among the base station radios. For each defined active channel, the base station 108 assigns a dwell time based on the number of channels assigned for the radio and an average number of client devices 102 per channel. The base station 108 later optimizes the dwell time once the onboarding is complete. To handle initial traffic, the base station 108 assigns a comparatively longer first data transmission time based on the number of new client devices 102 to be joined.

In a new deployment, each client device 102 has assigned thereto at least one channel from the beacon for the initial handshake with the base station 108. The client device 102 starts transmitting join-requests following the schedule the client device 102 received from the beacon. Each client device 102 is aware of the quantum and also has the CAD implemented. Once the client device 102 receives a join-accept, the client device 102 is registered for the data transmission. The client devices 102 in one example expect the following information from the base station 108: (i) timestamp, (ii) first data transmission time, (iii) period length of base station radio (in quantum); (iv) slot length (in quantum); (v) channel list (prioritized); and (vi) bulk beacon slot (if any).

Thus, the present disclosure allows devices, such as IoT devices, to operate within a TVWS network. For example, various examples described herein can be used in a cloud-backed IoT application. TVWS IoT implemented as described herein allows for large-scale IoT deployments (e.g., farming, oil field, gas fields, etc.) and can be backed by cloud and edge devices.

Figure 9:
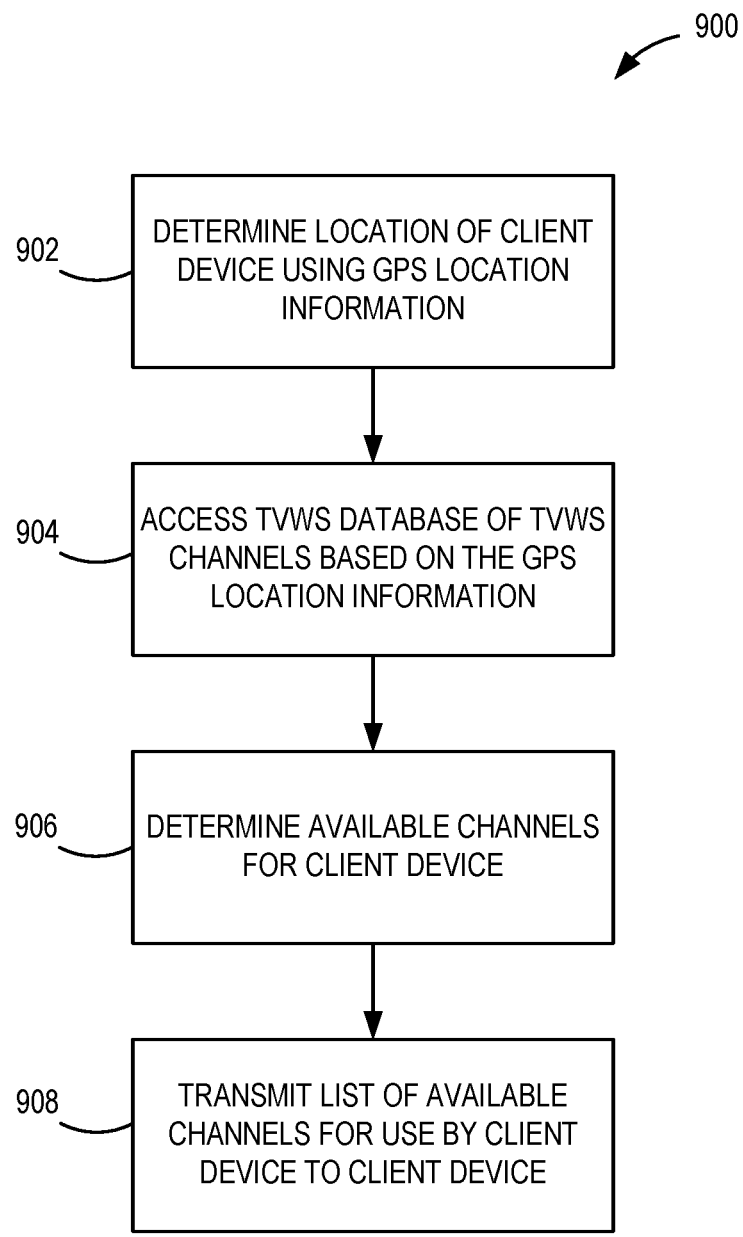
FIG. 9 is a flowchart illustrating operations of a computing device to configure communication of devices over a TVWS network according to an example.

FIG. 9 is a flowchart of a method 900 illustrating operations of a computing device (e.g., the base station 108) to configure communication of devices (e.g., client devices 102, such as IoT devices) over a TVWS network. For example, the method 900 configures the base station 108 to deploy information to the plurality of client devices 102 to allow the client devices 102 to communicate using the TVWS spectrum in a particular geographic region.

It should be appreciated that the computing device is implementable in different systems and applications. Thus, while the below-described example can be used in connection with an IoT application, the computing device configured according to the present disclosure is useable, for example, in many different applications, including any application using narrowband communication over a TVWS network.

At 902, the location of a client device is determined using GPS location information. For example, as described herein, client devices 102 communicate geo-location information to the base station 108 as determined by GPS devices onboard the client devices 102. The geo-location information can be communicated at defined intervals, after the client device 102 has moved a defined distance, etc.

A TVWS database, such as the TVWS database 112 is accessed at 904 based on the determined location information, and the available channels for the client device are determined at 906. For example, using the received geo-location information from the client device 102, the gateway 106 (that includes the base station 108) queries the TVWS database 112 with the location information for the client device 102. In response, the gateway 106 receives a list of available channels in the TVWS corresponding to the geo-location for the client device 102. That is, the gateway 106 determines the channels over which the client devices 102 can communicate (e.g., non-used TVWS channels in the region 302).

It should be noted that the gateway 106 in some examples periodically queries the TVWS database 112 and stores the available channel information for when the information is needed. That is, the gateway 106, in some examples, does not query the TVWS database 112 every time an available channel list is to be communicated to the client device 102. In one example, all of the client devices in the region 302 periodically report location information determined from GPS to the base station 108. The base station 108 then either accesses the stored available channels corresponding to the region 302 or, if the stored available channels were retrieved at a previous time that exceeds a defined time limit (out-of-date information), queries the TVWS database 112 to obtain an updated channel list.

The TVWS database 112 is any data store that contains information identifying available TVWS channels. For example, the TVWS database 112 is also commonly referred to as a geolocation database and is an entity that controls the TV spectrum utilization by unlicensed white spaces devices within a determined geographical area. The TVWS database 112 enables unlicensed access to the TVWS spectrum, while protecting incumbent broadcasting services.

At 908, a list of available channels for use by the client device 102 is transmitted to the client device 102. In one example, the list of channels sent to the client device 102 is less than the total number of available channels in the region 302. Thus, different subsets of the available channels in the region 302 are communicated to different client devices 102 in the region 302. As a result, the client devices 102 are enabled to communicate using the TVWS spectrum in the particular location of the client devices 102, namely within the region 302.

In some examples, from a list of available dynamic spectrum access channels, a set of channels is selected as active channels, wherein the active channels comprise uplink channels and downlink channels. The active channels are distributed among the plurality of base station radios of the base station, wherein a different channel is assigned to different base station radios of the plurality of base station radios. At least one uplink channel and at least one downlink channel are assigned to a plurality of client devices based on locations of the plurality of client devices, wherein at least some client devices of the plurality of client devices have active channels in common.

At least some of the client devices have the active channels in common on shared channels that include the active channels and at least one backup channel, and time slots are assigned to the client devices in the group to allow communication between the client devices by scheduling the communication using the shared channels to allow channel hopping between the active channels and the at least one backup channel. That is, in some examples, channel selection and distribution allows for communication on grouped channels having active and backup channels. In one example, some of the available channels are assigned as active channels with the remainder reserved as backup channels as described in more detail herein.

Figure 10:
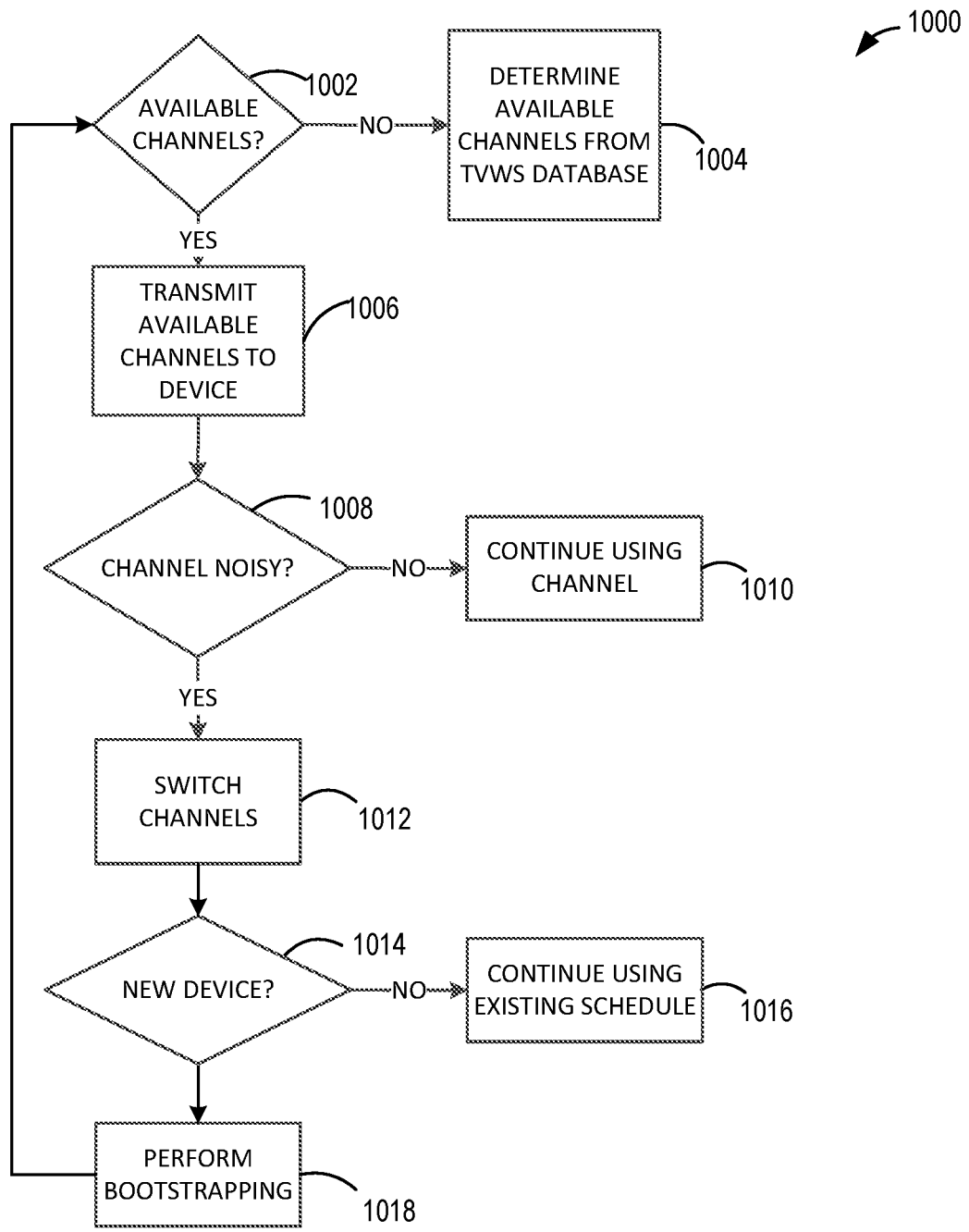
FIG. 10 is a flowchart illustrating operations of a computing device to schedule communication of devices over a TVWS network according to an example.

FIG. 10 is a flowchart of a method 1000 illustrating operations of a computing device (e.g., base station 108) to schedule communication of devices (e.g., client devices 102, such as IoT device) over a TVWS network. For example, the method 1000 configures channel selection and scheduling for the base station 108 and the plurality of client devices 102 to allow the client devices 102 to communicate using the TVWS spectrum in a particular geographic region.

At 1002, a determination is made as to whether TVWS channels are available for use in communications. As described herein, in some examples, the available channels are determined from the TVWS database 112. If channels are not available, such as for one or more client devices 102, then at 1004 available channels are determined from the TVWS database 112. For example, the gateway 106 is enabled to determine the available channel information from the TVWS database 112 and the base station 108 transmits an available list to the client devices 102. If there are available channels as previously determined from the TVWS database 112 (and still having an acceptable quality level), then a list of available channels is transmitted to the client devices 102 at 1006. In some examples, signal quality information, such as RSSI and/or SNR can be used to determine the best available channels in the region 302, and/or to select channels.

Similarly, the quality or availability of one or more of the available channels can change. That is, an available channel for one or more client devices 102 can become noisy. A determination is made at 1008 if a channel is noisy. If the channel is not noisy, such that acceptable communications are still possible, the channel continues to be used at 1010. If the channel is determined to be noisy at 1008, then channels are switched at 1012. For example, a client device 102 switches between active available channels using one or more hopping techniques described herein. It should be noted that the timing (schedule) of the hopping can vary based on the number of radios, the number of shared channels, etc. as described herein.

A determination is made at 1014 whether any new client devices 102 are present. For example, a determination is made whether any new client devices 102 are present in the region 302 and need to be configured to communicate using the available channels and defined timing schedule. If no new client devices 102 are present, then the existing channel and timing schedule is maintained at 1016. If one or more new client devices 102 are present, then bootstrapping is performed at 1018. For example, as described herein, the buffer slot 402 can be used for configuring the new client device(s) 102. In one example, the new client device(s) 102 is preloaded with a list of channels, then the new client device(s) 102 listen on the preloaded channels, and the base station 108 transmits on one or more of the channels with a message of available channels, and the new client device(s) 102 selects from the available channels based on the new client device(s) 102 GPS location (which is known). The base station 108 and the client device(s) 102 are time-synchronized based on GPS time, so the client device(s) 102 know when to listen for base station 108 transmission (during the buffer slot 402).

Thus, a TVWS network is configured to allow communications, such as between IoT devices. For example, the present disclosure allows for a TVWS IoT network to be deployed over a larger geographic region having varying channel availability.

Exemplary Operating Environment

Figure 11:
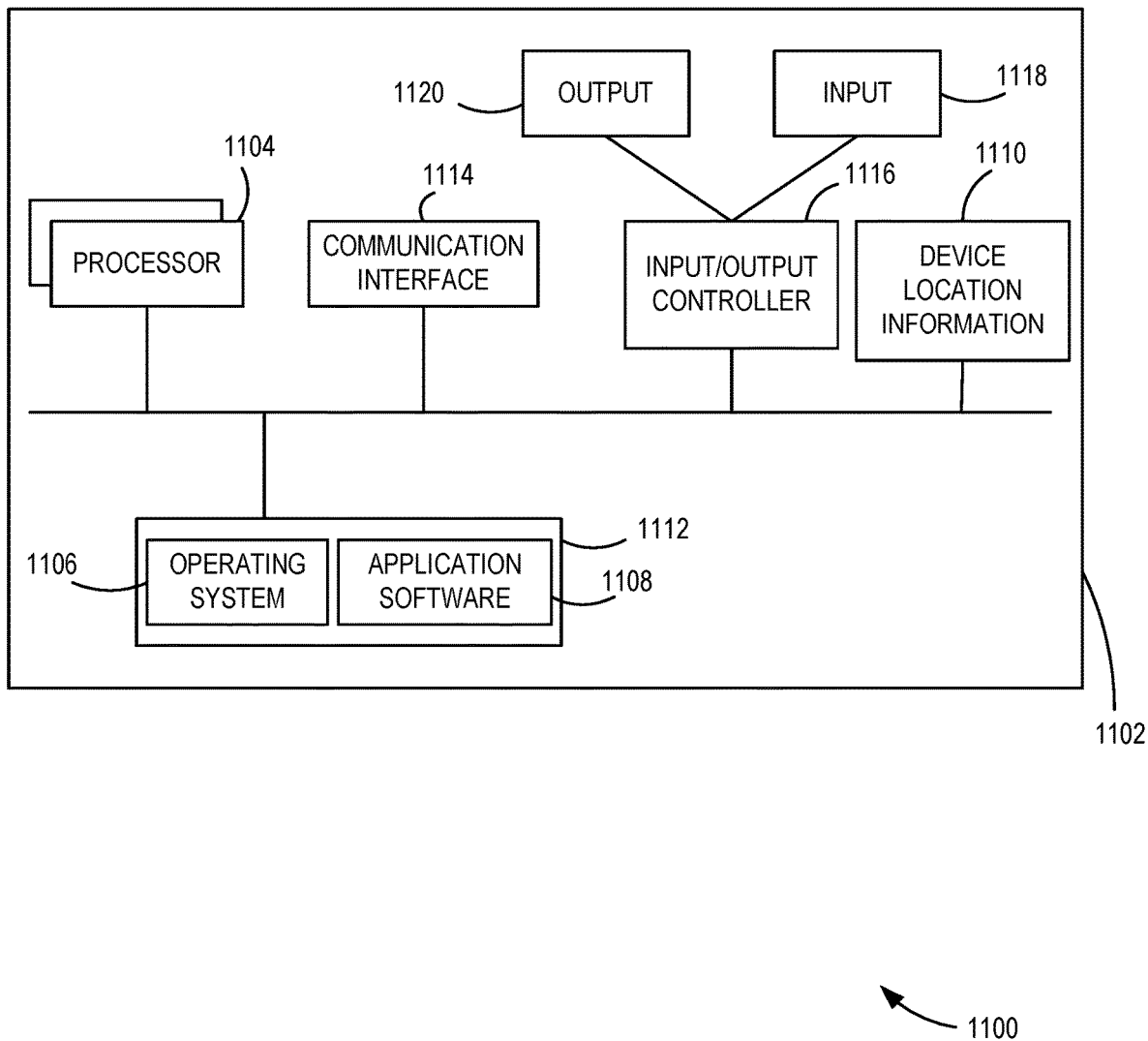
FIG. 11 illustrates a computing apparatus according to example as a functional block diagram.

The present disclosure is operable with a computing apparatus 1102 according to an example as a functional block diagram 1100 in FIG. 11, such as an IoT device. In one example, components of the computing apparatus 1102 may be implemented as a part of an electronic device according to one or more examples described in this disclosure. The computing apparatus 1102 comprises one or more processors 1104 which may be microprocessors, controllers or any other suitable type of processors for processing computer executable instructions to control the operation of the computing apparatus 1102. Platform software comprising an operating system 1106 or any other suitable platform software may be provided on the computing apparatus 1102 to enable application software 1108 to be executed on the computing apparatus 1102. According to an example, communication via TVWS channels determined from device location information 1110, such as implemented with an IoT client device, may be accomplished by software and/or hardware.

Computer executable instructions may be provided using any computer-readable media that are accessible by the computing apparatus 1102. Computer-readable media may include, for example, computer storage media such as a memory 1112 and communications media. Computer storage media, such as the memory 1112, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 1112) is shown within the computing apparatus 1102, it will be appreciated by a person skilled in the art, that the storage may be distributed or located remotely and accessed via a network or other communication link (e.g. using a communication module, such as a communication interface 1114).

The computing apparatus 1102 in one example includes an input/output controller 1116 configured to output information to one or more input devices 1118 and output devices 1120, for example a display or a speaker, which may be separate from or integral to the electronic device. The input/output controller 1116 in some examples is configured to receive and process an input from one or more input devices 1118, such as a control button or touchpad. In one example, the output device 1120 acts as the input device 1118. An example of such a device may be a touch sensitive display. The input/output controller 1116 in one example also outputs data to devices other than the output device 1120, e.g. a locally connected printing device. In some examples, a user provides input to the input device(s) 1118 and/or receives output from the output device(s) 1120.

In one example, the computing apparatus 1102 detects voice input, user gestures or other user actions and provides a natural user interface (NUI). This user input is used to author electronic ink, view content, select ink controls, play videos with electronic ink overlays and for other purposes. The input/output controller 1116 outputs data to devices other than a display device in some examples, e.g. a locally connected printing device.

The functionality described herein can be performed, at least in part, by one or more hardware logic components. According to an example, the computing apparatus 1102 is configured by the program code when executed by the processor(s) 1104 to execute the example of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures. Additionally, in some aspects, the computing apparatus 1102 is a base station or client device configured to have communication capabilities over the TVWS frequency spectrum.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

A system for communication using dynamic spectrum access comprises at least one processor; and at least one memory comprising computer program code, the at least one memory and the computer program code configured to, with the at least one processor, cause the at least one processor to: select from a list of available dynamic spectrum access channels, a set of channels as active channels, the active channels comprising uplink channels and downlink channels; distribute the active channels among a plurality of base station radios of a base station, wherein a different channel is assigned to different base station radios of the plurality of base station radios; assign at least one uplink channel and at least one downlink channel to a plurality of client devices based on locations of the plurality of client devices, wherein at least some client devices of the plurality of client devices have active channels in common; group at least some of the client devices having the active channels in common on shared channels that include the active channels and at least one backup channel; and assign time slots to the client devices in the group to allow communication between the client devices by scheduling the communication using the shared channels to allow channel hopping between the active channels and the at least one backup channel.

A computerized method for communication using dynamic spectrum access comprises selecting from a list of available dynamic spectrum access channels, a set of channels as active channels, the active channels comprising uplink channels and downlink channels; distributing the active channels among a plurality of base station radios of a base station, wherein a different channel is assigned to different base station radios of the plurality of base station radios; assigning at least one uplink channel and at least one downlink channel to a plurality of client devices based on locations of the plurality of client devices, wherein at least some client devices of the plurality of client devices have active channels in common; grouping at least some of the client devices having the active channels in common on shared channels that include the active channels and at least one backup channel; and assigning time slots to the client devices in the group to allow communication between the client devices by scheduling the communication using the shared channels to allow channel hopping between the active channels and the at least one backup channel.

One or more computer storage media having computer-executable instructions for communication using dynamic spectrum access, upon execution by a processor, cause the processor to at least: select from a list of available dynamic spectrum access channels, a set of channels as active channels, the active channels comprising uplink channels and downlink channels; distribute the active channels among a plurality of base station radios of a base station, wherein a different channel is assigned to different base station radios of the plurality of base station radios; assign at least one uplink channel and at least one downlink channel to a plurality of client devices based on locations of the plurality of client devices, wherein at least some client devices of the plurality of client devices have active channels in common; group at least some of the client devices having the active channels in common on shared channels that include the active channels and at least one backup channel; and assign time slots to the client devices in the group to allow communication between the client devices by scheduling the communication using the shared channels to allow channel hopping between the active channels and the at least one backup channel.

Alternatively, or in addition to the other examples described herein, examples include any combination of the following:

grouping all client devices having the active channels in common on same ones of the shared channels and assign different time slots for communication for each of the client devices on the same ones of the shared channels;

grouping client devices having at least two active channels in common to share one or more of the active channels, and assign the remaining client devices only one active channel, wherein a dwell time is a same for all active channels, the dwell time of the base station radios on an uplink channel defining the time the base station radios stay on an uplink channel to serve the grouped client devices, and a number of dwell time overlaps are no greater than a number of available base station radios;

grouping acknowledgements from the plurality of client devices on a same active channel, the acknowledgments containing medium access control (MAC) commands specific to the client devices, wherein each message of a plurality of messages on the uplink channels is followed by a downlink acknowledgement;

wherein the plurality of client devices is located within a plurality of regions and selecting one active channel as a beaconing channel to communicate during a beaconing period by hopping across the downlink channels on which the base station can communicate and transmit a beacon signal on each of the downlink channels, the beaconing period occurring outside of a normal transmission period, wherein the beacon signals have embedded information including coordinates of a region of the plurality of regions, available channels for the region and a buffer slot in the channels;

using the beaconing period to configure a new client device, the new client device hopping across a plurality of channels stored within the new client device, the new client device identifying during the beaconing period (i) a region of the plurality of regions in which the new client device is located based on a GPS location of the new client device and (ii) available channels from the plurality of channels stored within the new client device;

wherein each of the client devices within the group sequentially hops across the active channels in common and transmits data at the assigned time slot for the client device on each of the active channels, such that each client device changes the active channel on which the client device is transmitting at each of the assigned time slots for the client device;

allow a client device to communicate only on the assigned uplink and downlink channels and during the assigned time slot, wherein a time slot length for the assigned time slot for each client device is determined based at least on a throughput requirement of the client device and a configuration of the plurality of base station radios, wherein each client device begins communication within the assigned time slot assigned to the client device based at least in part on communication configuration information received from one or more of the plurality of base station radios, the communication configuration information comprising at least a timestamp, a first data transmission time, a period length of the plurality of base station radios, and a slot length of the assigned time slot; and wherein the base station and the plurality of client devices each have a local count-up counter and a local count-down counter, the local count-up counter and the local count-down counter of the base station are shared with the plurality of client devices, and vice versa, as shared counters within uplink and downlink packets, and identifying a number of missing packets based on a mismatch between (i) the shared counters and (ii) the local count-up counters and a local count-down counters, the mismatch defining a quality level, and switching channels when the mismatch exceeds a predetermined number.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one example or may relate to several examples. The examples are not limited to those that solve any or all of the stated problems or those that have any or all of the stated benefits and advantages. It will further be understood that reference to 'an' item refers to one or more of those items.

The examples illustrated and described herein as well as examples not specifically described herein but within the scope of aspects of the claims constitute exemplary means for device communication using the TVWS spectrum.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
a processor; and
a memory comprising computer program code, the computer program code configured to, with the processor, cause the processor to:
select from a list of available dynamic spectrum access channels, a set of channels as active channels, the active channels comprising uplink channels and downlink channels;
assign an uplink channel and a downlink channel to a plurality of client devices based on locations of the plurality of client devices;
select one active channel as a beaconing channel to communicate during a beaconing period by hopping across the downlink channels on which a base station can communicate;
transmit a beacon signal on each of the downlink channels, the beaconing period occurring outside of a normal transmission period;
identify a subset of client devices of the plurality of client devices having an active channel in common; and
group acknowledgements from the subset of client devices having the common active channel, the acknowledgments containing medium access control (MAC) commands specific to the subset of client devices, wherein each message of a plurality of messages on the uplink channels is followed by a downlink acknowledgement.

2. The system of claim 1, wherein a beacon signal has embedded information including coordinates of a region of the plurality of regions, available channels for the region, and a buffer slot in the channels.

3. The system of claim 1, wherein the computer program code is further configured to cause the processor to:
configure a new client device using the beaconing period, the new client device hopping across a plurality of channels stored within the new client device, the new client device identifying during the beaconing period (i) a region of the plurality of regions in which the new client device is located based on a global positioning system (GPS) location of the new client device and (ii) available channels from the plurality of channels stored within the new client device.

4. The system of claim 1, wherein the computer program code is further configured to cause the processor to:
group the subset of client devices having the common active channel on shared channels that include the common active channel and at least one backup channel; and
assign time slots to the grouped client devices.

5. The system of claim 4, wherein the computer program code is further configured to cause the processor to:
allow a client device of the grouped client devices to communicate only on the assigned uplink channel and the assigned downlink channel during an assigned time slot, wherein a time slot length for the assigned time slot for each client device is determined based at least on a throughput requirement of the client device and a configuration of a plurality of base station radios, wherein each client device begins communication within the assigned time slot assigned to the client device based at least in part on communication configuration information received from one or more of the plurality of base station radios.

6. The system of claim 5, wherein the communication configuration information comprises at least a timestamp, a first data transmission time, a period length of the plurality of base station radios, and a slot length of the assigned time slot.

7. The system of claim 4, wherein the computer program code is further configured to cause the processor to:
responsive to grouping the subset of client devices having the common active channel, assign remaining client devices only one active channel, wherein a dwell time is the same for all active channels, the dwell time of the base station radios on an uplink channel defining a time the base station radios stay on an uplink channel to serve the grouped client devices, and a number of dwell time overlaps are no greater than a number of available base station radios.

8. The system of claim 1, wherein the system is configured for communication using a television white space (TVWS) spectrum.

9. A computerized method for communication using dynamic spectrum access, the computerized method comprising:
selecting from a list of available dynamic spectrum access channels, a set of channels as active channels, the active channels comprising uplink channels and downlink channels;
assigning an uplink channel and a downlink channel to a plurality of client devices based on locations of the plurality of client devices;
selecting one active channel as a beaconing channel to communicate during a beaconing period by hopping across the downlink channels on which a base station can communicate;
transmitting a beacon signal on each of the downlink channels, the beaconing period occurring outside of a normal transmission period;
identifying a subset of client devices of the plurality of client devices having an active channel in common; and
grouping acknowledgements from the subset of client devices having the common active channel, the acknowledgments containing medium access control (MAC) commands specific to the subset of client devices, wherein each message of a plurality of messages on the uplink channels is followed by a downlink acknowledgement.

10. The computerized method of claim 9, wherein a beacon signal has embedded information including coordinates of a region of the plurality of regions, available channels for the region, and a buffer slot in the channels.

11. The computerized method of claim 9, further comprising:
configuring a new client device using the beaconing period, the new client device hopping across a plurality of channels stored within the new client device, the new client device identifying during the beaconing period (i) a region of the plurality of regions in which the new client device is located based on a global positioning system (GPS) location of the new client device and (ii) available channels from the plurality of channels stored within the new client device.

12. The computerized method of claim 9, further comprising:
grouping the subset of client devices having the common active channel on shared channels that include the common active channel and at least one backup channel; and
assign time slots to the grouped client devices.

13. The computerized method of claim 12, further comprising:
allowing a client device of the grouped client devices to communicate only on the assigned uplink channel and the assigned downlink channel during an assigned time slot, wherein a time slot length for the assigned time slot for each client device is determined based at least on a throughput requirement of the client device and a configuration of a plurality of base station radios, wherein each client device begins communication within the assigned time slot assigned to the client device based at least in part on communication configuration information received from one or more of the plurality of base station radios.

14. The computerized method of claim 12, further comprising:
responsive to grouping the subset of client devices having the common active channel, assigning remaining client devices only one active channel, wherein a dwell time is the same for all active channels, the dwell time of the base station radios on an uplink channel defining a time the base station radios stay on an uplink channel to serve the grouped client devices, and a number of dwell time overlaps are no greater than a number of available base station radio.

15. One or more computer storage media having computer-executable instructions for communication using dynamic spectrum access, that upon execution by a processor, cause the processor to at least:
select from a list of available dynamic spectrum access channels, a set of channels as active channels, the active channels comprising uplink channels and downlink channels;
assign an uplink channel and a downlink channel to a plurality of client devices based on locations of the plurality of client devices;
select one active channel as a beaconing channel to communicate during a beaconing period by hopping across the downlink channels on which a base station can communicate;
transmit a beacon signal on each of the downlink channels, the beaconing period occurring outside of a normal transmission period;
identify a subset of client devices of the plurality of client devices having an active channel in common; and
group acknowledgements from the subset of client devices having the common active channel, the acknowledgments containing medium access control (MAC) commands specific to the subset of client devices, wherein each message of a plurality of messages on the uplink channels is followed by a downlink acknowledgement.

16. The one or more computer storage media of claim 15, having further computer executable instructions that, upon execution by the processor, cause the processor to:
configure a new client device using the beaconing period, the new client device hopping across a plurality of channels stored within the new client device, the new client device identifying during the beaconing period (i) a region of the plurality of regions in which the new client device is located based on a global positioning system (GPS) location of the new client device and (ii) available channels from the plurality of channels stored within the new client device.

17. The one or more computer storage media of claim 15, having further computer executable instructions that, upon execution by the processor, cause the processor to:
group the subset of client devices having the common active channel on shared channels that include the common active channel and at least one backup channel; and
assign time slots to the grouped client devices.

* * * * *